March 27, 1962 R. W. LAKIN ETAL 3,027,039
PRESSURE VESSELS

Filed June 25, 1958 5 Sheets-Sheet 1

INVENTORS
RAYMOND WALLIS LAKIN
SIDNEY HOWARD GRIFFITHS
BY
ATTORNEYS

March 27, 1962 R. W. LAKIN ETAL 3,027,039
PRESSURE VESSELS
Filed June 25, 1958 5 Sheets-Sheet 2

INVENTORS
RAYMOND WALLIS LAKIN
SIDNEY HOWARD GRIFFITHS

BY Lawson and Taylor
ATTORNEYS

March 27, 1962  R. W. LAKIN ETAL  3,027,039
PRESSURE VESSELS
Filed June 25, 1958  5 Sheets-Sheet 3
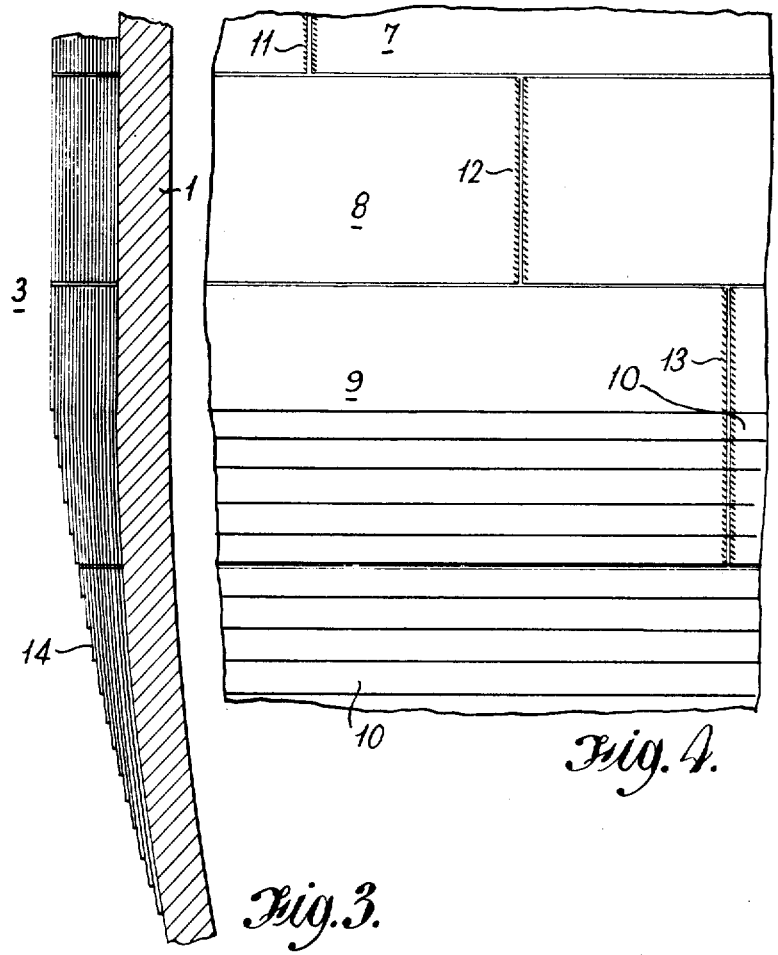
Fig.3.  Fig.4.
Fig.5.
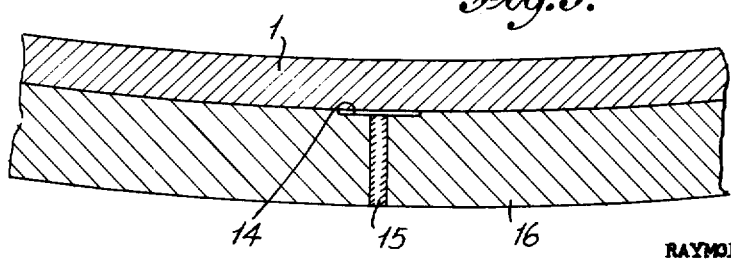
INVENTORS
RAYMOND WALLIS LAKIN
SIDNEY HOWARD GRIFFITHS
BY Lawsey and Taylor
ATTORNEYS

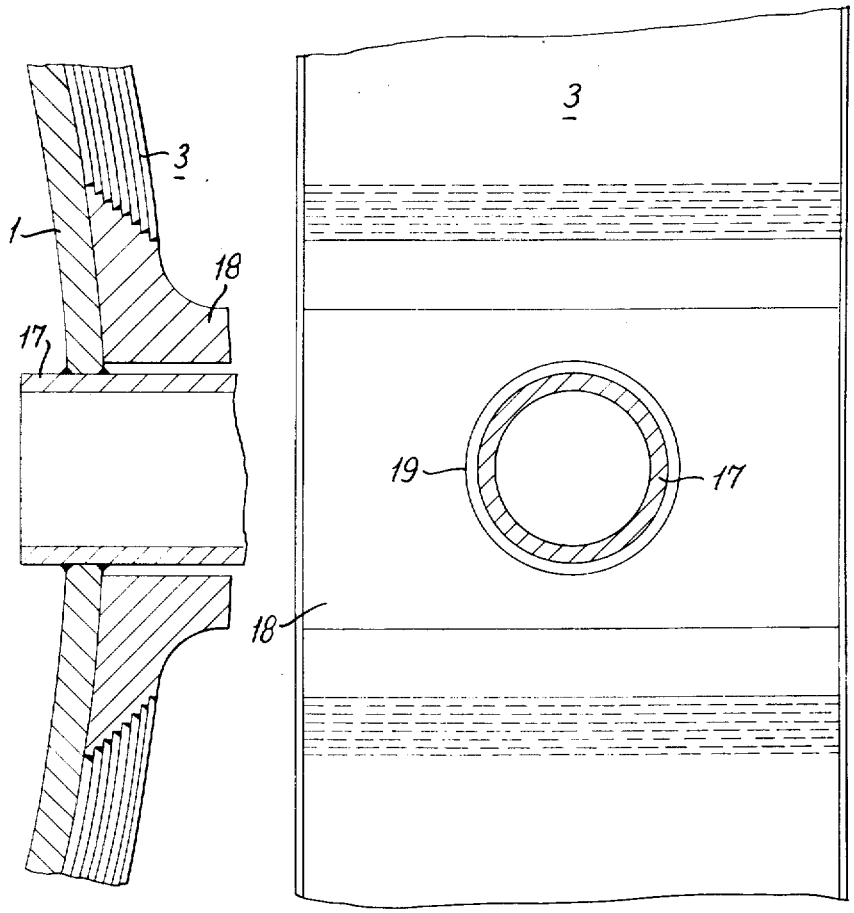

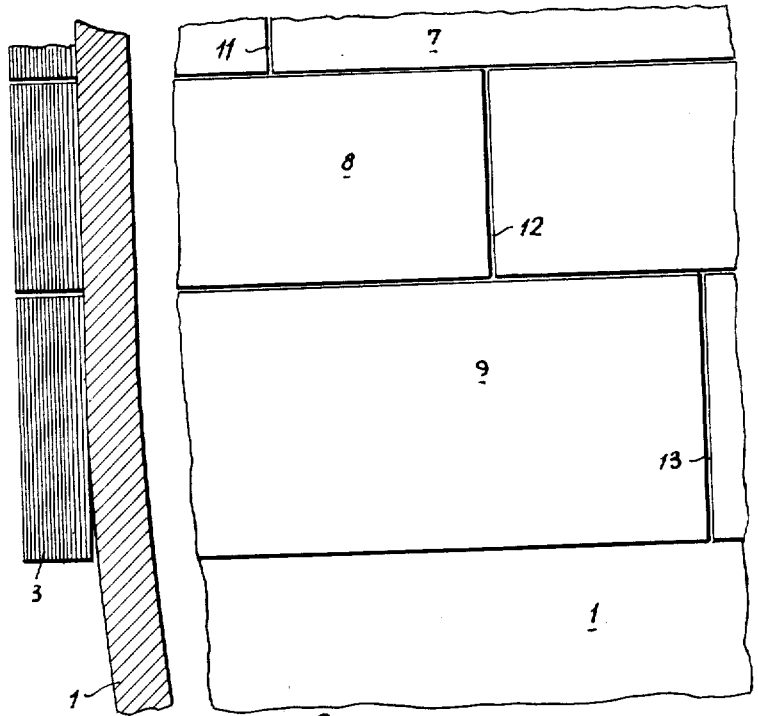
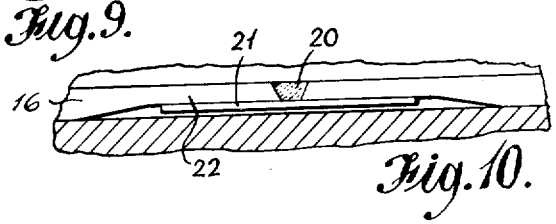
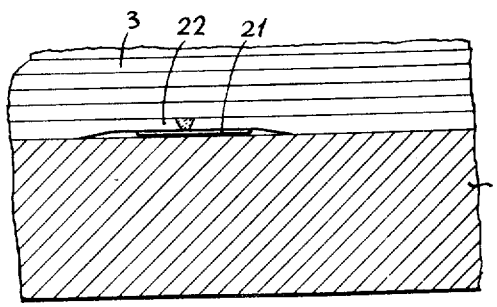

United States Patent Office 3,027,039
Patented Mar. 27, 1962

3,027,039
PRESSURE VESSELS
Raymond Wallis Lakin, Timperley, and Sidney Howard Griffiths, Sedgley, near Dudley, England, assignors to A.E.I.-John Thompson Nuclear Energy Company Limited, London, England, a British company
Filed June 25, 1958, Ser. No. 744,550
4 Claims. (Cl. 220—3)

This invention relates to pressure vessels for withstanding high internal fluid pressures and especially to large pressure vessels which are fabricated on site.

The invention has an important application, inter alia, in pressure vessels for nuclear reactors but it has other applications such as to pressure vessels used in the chemical industry and in oil refining.

The construction on site of large pressure vessels of this type presents considerable difficulty, particularly in cases in which the vessel has to withstand high fluid pressures, e.g. of the order of 200 lbs./sq. in. or more.

Merely increasing the thickness of the wall of the vessel in accordance with increase in pressure is quite insufficient since, apart from economic and constructional factors, there is a greater tendency for internal flaws in thick walls and, moreover, inspection is much more difficult.

One form of construction which has been employed is a laminar construction which consists of an inner shell which is of relatively light construction and is externally reinforced. The side wall is reinformed with bands which are pushed on to the inner shell whilst the ends of the shell are reinforced by end structures of a fairly massive construction which are externally supported.

Another construction which has been employed consists in pulling reinforcing bands circumferentially around the cylindrical side walls and joining the ends by welding.

The reinforcing bands have been extended along the full length of the side walls and the end walls have been a continuation of the composite side wall and in consequence have been thick.

Such a construction is suitable for fabrication in a shop rather than on site.

Moreover with both these constructions there is no relationship between the initial pressure and the initial shell thickness.

The main object of the invention is to provide an improved construction which is suitable for large pressure vessels having high internal pressures.

According to the present invention a pressure vessel for high fluid pressures comprises a main shell having a cylindrical side wall, hemispherical end walls which are continuous with the side wall and reinforcing banding extending circumferentially around the exterior of the side wall the ends of which banding are joined together without adhesion to the wall of the pressure vessel.

There may be a single band or a number of reinforcing bands arranged one around the other, i.e. concentrically.

Wide bands may be employed whose width extends along the whole or the greater part of the length of the cylindrical wall.

Alternatively a number of narrow bands may be employed which are arranged side by side.

Preferably in the case of bands next to the wall of the pressure vessel the ends to be joined are under-cut and a backing strip is located underneath the joint to prevent adhesion of the band to the pressure vessel wall when welding takes place.

Constructions in accordance with the invention have a particular advantage in the case of a nuclear reactor pressure vessel as the majority, if not all, the connections e.g. the coolant gas ducting can be made to the ends of the pressure vessel so as not to disturb the bands.

In order that the invention may be more clearly understood reference will now be made to the accompanying drawings, which show the invention applied to a nuclear reactor and in which:

FIG. 3 is a detail sectional view showing the ends of the reinforcing bands;

FIG. 4 is another detail view showing part of the reinforcing bands of FIG. 3 looking in the direction of the arrow IV;

FIG. 5 is a detail view showing how the backing strip is placed underneath the weld in the reinforcing ring in the case of a single band construction;

FIG. 6 is a detail vertical sectional view showing how a duct can be inserted through the reinforcing rings;

FIG. 7 is a view looking in the direction of the arrow VII of FIG. 6;

FIGS. 8 and 9 show views corresponding to FIGS. 3 and 4 respectively of a modified arrangement;

FIG. 10 is a detail view of a modified form of joint in the case of a single band construction; and FIG. 11 shows how the construction of FIG. 10 could be applied to a multiple band construction.

Figure 1:
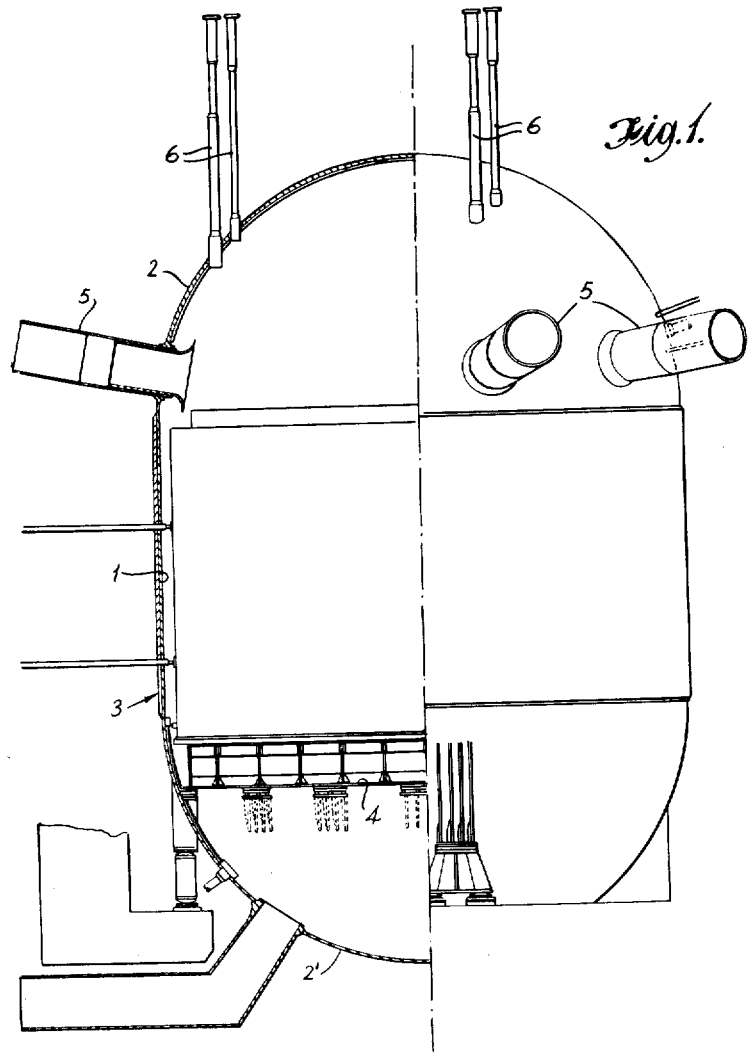
FIG. 1 is a vertical view partly in section of a pressure vessel embodying the invention.

In FIG. 1 the reference 1 indicates the cylindrical side wall of the pressure vessel and 2, 2′ the hemispherical end walls. The cylindrical side wall 1 is reinforced by banding 3 extending circumferentially around it. In FIG. 1 the reference 4 indicates a support structure for a reactor core whilst 5 are gas ducts leading through the hemispherical end walls and 6 are pipes through which the charging apparatus passes the fuel elements. It will be appreciated that the banding may comprise a single wide band or a number of bands side by side.

FIGS. 3 and 4 show a construction in which the reinforcing is carried out by a number of bands extending circumferentially around the pressure vessel and placed one around the other i.e. in layers. Moreover, each layer may consist of a number of bands placed side by side.

In FIG. 4 there are shown portions of several bands, four of which bands are indicated by references 7, 8, 9 and 10. The band 7 is pulled around the wall of the pressure vessel and is joined by welding along the line 11. Similarly the band 8 is joined by the weld 12 and the band 9 by the weld 13, it being noted that these weld joints are staggered around the circumference of the vessel. At the top and bottom of the side wall the bands are shown receding from the end, as indicated in FIG. 3 so as to form a chamfered end. It is contemplated that in manufacture the ends of each band will be drawn around the circumference of the vessel until the ends meet. This may be accomplished by wires or cables secured temporarily to the bands. The ends are then joined together by welding. This will normally be carried out for each band in turn. Each band may consist of a single circumferential length of metal or it may be formed of several lengths which are joined end to end as they are placed around the wall of the pressure vessel. This latter construction may be desirable in the case of large structures.

It is important to ensure that the bands do not adhere to the wall of the pressure vessel during welding and this may be avoided by under-cutting the ends of the band, on the inner band in the case of a multilayer construction, and inserting a backing strip 14 as shown in FIG. 5 where the reference 15 indicates a weld joint joining the circumferential ends of a single band 16. The backing strip may be of any suitable metal which will withstand the welding temperature. The reinforcing bands, other than the inner band, may similarly be under-cut but in this case it will not be necessary to provide a backing strip as this will be provided by the inner reinforcing rings.

Figure 2:
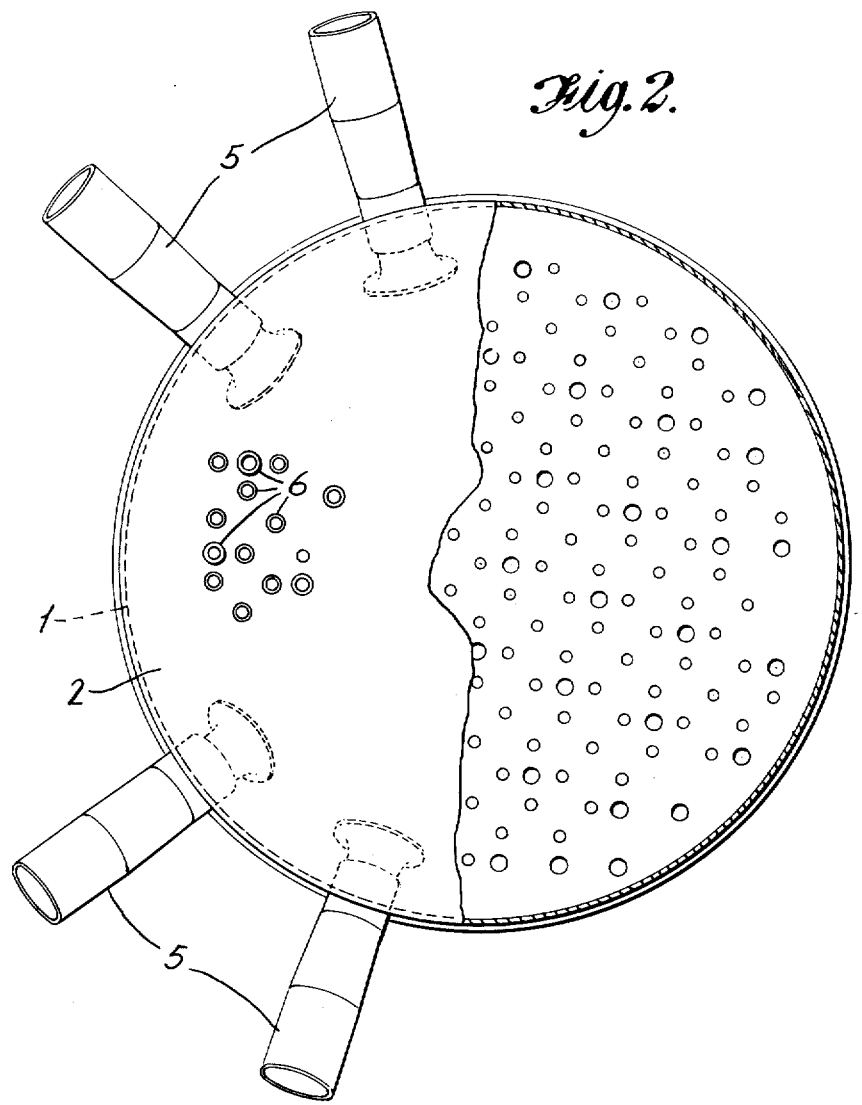
FIG. 2 is a plan view also partly in section of the pressure vessel shown in FIG. 1.

As shown in FIGS. 1 and 2, with such a construction it is convenient to make as many as possible of the connections, e.g. the coolant ducting, through the hemispherical end walls. In cases, however, in which it is necessary to insert a duct through the band a construction, such as that shown in FIGS. 6 and 7, may be employed. In this case a duct 17 is inserted through the wall 1 to which it is joined by welding and the bands 3 are cut away and joined to a coupling plate 18 which has a central aperture 19, the wall of which is spaced from the duct 17.

FIGS. 8 and 9 are views corresponding respectively to FIGS. 3 and 4 but showing an arrangement in which the ends of the bands are not chamfered.

FIG. 10 shows one way of joining the ends of a single band. In this arrangement the ends of the band 16 are joined by a V weld 20 with a backing plate 21 inserted between the welded joint 20 and the wall of the pressure vessel.

To accommodate the backing plate the band 16 is formed with ends 22 of reduced thickness.

FIG. 11 shows an alternative construction applied in this case to multi-layer banding indicated generally by the reference 3.

In this arrangement the next weld 23 is staggered around the pressure vessel.

What we claim is:

1. A pressure vessel for high internal fluid pressures comprising a main shell having a cylindrical side wall and hemispherical end walls continuous with said side wall, reinforcing banding extending circumferentially around the exterior of the side wall, welded jointing joining the ends of said banding, said banding being recessed on the inner face adjacent the jointing, and backing strip material located underneath said jointing and within the recess without connection to the pressure vessel wall to prevent adhesion of the band to the pressure vessel during welding.

2. A pressure vessel for high internal fluid pressures comprising a main shell having a cylindrical side wall and hemispherical end walls continuous with said side wall, reinforcing banding extending circumferentially around the exterior of the side wall, said banding comprising a plurality of layers arranged concentrically, welded joints joining the ends of said respective layers, the innermost layer being recessed on the inner face adjacent the jointing, and backing strip material between the innermost layer and the wall of the pressure vessel and within said recess without connection to the pressure vessel wall to prevent adhesion of the banding when welding takes place.

3. A pressure vessel for high internal fluid pressures comprising a main shell having a cylindrical side wall and hemispherical end walls continuous with said side wall, reinforcing banding extending circumferentially around the exterior of the side wall, said banding comprising a plurality of layers arranged concentrically each layer comprising a plurality of bands arranged side by side, welded jointing joining the ends of said respective layers, the innermost layer being recessed on the inner face adjacent the jointing, and backing strip material between the innermost layer and the wall of the pressure vessel and within said recess without connection to the pressure vessel wall to prevent adhesion of the banding when welding takes place.

4. A pressure vessel for a gas cooled nuclear reactor comprising a main shell having a vertical cylindrical side wall and hemispherical end walls continuous with said side wall, reinforcing banding extending circumferentially around the exterior of said side wall, means for joining the ends of said banding without adhesion to the wall of the pressure vessel, said means comprising welded jointing between the ends of the banding, said banding being recessed on the inner face adjacent the jointing and a backing strip being located in the recess without connection to the pressure vessel wall, gas inlets and outlets extending through said hemispherical end walls and fuel charging pipes extending through the upper hemispherical end wall.

References Cited in the file of this patent

UNITED STATES PATENTS

| 1,925,118 | Stresau | Sept. 5, 1933 |
| 1,961,117 | Wall | May 29, 1934 |
| 2,083,340 | Merker | June 8, 1937 |
| 2,232,656 | Davis | Feb. 18, 1941 |
| 2,362,505 | Smith | Nov. 14, 1944 |
| 2,376,351 | Gay | May 22, 1945 |

FOREIGN PATENTS

| 455,595 | Great Britain | Oct. 23, 1936 |